United States Patent [19]

Kurata et al.

[11] Patent Number: 4,469,433
[45] Date of Patent: Sep. 4, 1984

[54] COLOR COPYING MACHINE USING SIGNAL CONVERSION

[75] Inventors: Masami Kurata; Takashi Ohmori, both of Kanagawa, Japan

[73] Assignee: Fuji Xerox Co., Ltd., Tokyo, Japan

[21] Appl. No.: 437,396

[22] Filed: Oct. 28, 1982

[30] Foreign Application Priority Data

Oct. 30, 1981 [JP] Japan .................................. 56-172892

[51] Int. Cl.³ .......................................... G03G 15/01
[52] U.S. Cl. .................................... 355/4; 355/14 C; 355/14 R; 430/43; 118/645; 250/316.1; 250/319
[58] Field of Search .................... 355/4, 7, 3 R, 14 R, 355/14 D, 14 C; 250/316.1; 346/76 PH; 430/43; 118/645

[56] References Cited

U.S. PATENT DOCUMENTS

| | | | |
|---|---|---|---|
| 4,204,728 | 5/1980 | Goshima et al. | 355/4 |
| 4,275,958 | 6/1981 | Tachika et al. | 355/14 R |
| 4,336,994 | 6/1982 | Banton | 430/43 X |
| 4,349,268 | 9/1982 | Hirata | 355/4 |
| 4,374,397 | 2/1983 | Mir | 355/4 X |

Primary Examiner—A. C. Prescott
Attorney, Agent, or Firm—Sughrue, Mion, Zinn, Macpeak, and Seas

[57] ABSTRACT

A color copying machine includes a device separating the image information from each area of the original into colors corresponding to predetermined recording colors to thereby form corresponding video signals. A preferential selection circuit converts each video signal into a 2-level signal and performs an arithmetic operation on each 2-level signal to thereby key the image information from each area of the original to one of the recording colors or white. Black is selected as the recording color if a chromatic color competes with black in the same area.

8 Claims, 11 Drawing Figures

RED　　BLUE　　GREEN　　BLACK　　WHITE

RED　　BLUE　　GREEN　　BLACK　　WHITE

COLOR COPYING MACHINE USING SIGNAL CONVERSION

BACKGROUND OF THE INVENTION

The present invention relates to a color copying machine using more than one recording color.

Conventional color copying machines provide a desired image by optically separating image information of the original and by combining two or more recording colors. In xerographic color copying using three color toners, i.e., yellow, cyan and magenta, color separation is effected with red, blue and green filters and the densities of the three colors, yellow, cyan and magenta, are properly controlled depending upon the color to be reproduced. While halftone color or mixed colors can be easily reproduced by such color copiers, the failure to transfer the recording colors in registry with one another results in very poor image quality. This defect frequently occurs in the circular portion of a letter, but it has been very difficult to avoid this problem by color registration, i.e. by accurately superposing the transferred colors in their respective positions on the receiving sheet. In ordinary color originals, the greater part of the image information is assumed by black or while colors (achromatic colors) and the chromatic area does not have to achieve the maximum color fidelity of the original, and, as is often the case with a multi-colored graph or a colored letter, the chromatic region may only have to be visually distinguished from other areas.

SUMMARY OF THE INVENTION

Therefore, one object of the present invention is to provide a color copying machine capable of reproducing image information from each part of an original without using mixed colors. This object can be achieved by a copying machine including reading means which separates the image information from each part of the original into colors that correspond to predetermined recording colors to thereby form respective image signals, and a preferential circuit that performs a logical operation on these image signals and selects one chromatic recording color or a white (non-recording) color in preference over other colors for each area of the original. By using this copying machine, the original is reproduced without using a mixed color, but with the recording colors determined in the preferential circuit.

DETAILED DESCRIPTION OF THE PREFERRED EMBODIMENTS

Figure 1:
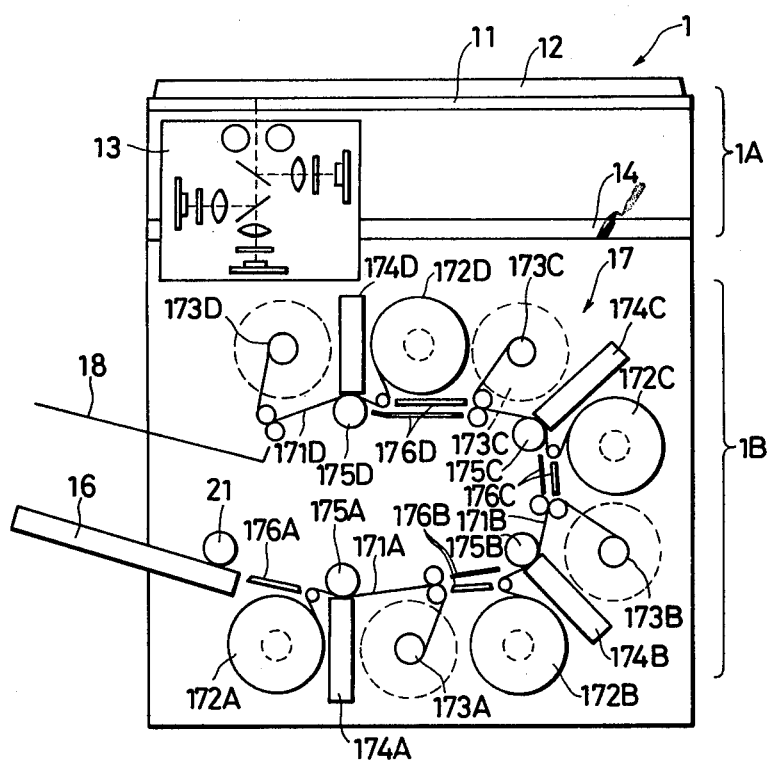
FIG. 1 is a schematic representation of a color copying machine according to the embodiment of the present invention.

FIG. 1 shows schematically a color copying machine using red, blue, green and black colors. The copying machine generally indicated at 1 has an upper reading section 1A and a lower recording section 1B. Reading section 1A includes a horizontal platen 11 for supporting the original, a platen cover 12 for fixing the original on the platen, a reading unit 13 for reading the image information, and rails 14 along which the reading unit 13 is reciprocated. Recording section 1B includes a feed tray 16 for feeding recording sheets, a recording mechanism 17 effecting thermal transfer recording, a catch tray 18 in which the copies are discharged, etc.

When the operator sets the original on the platen 11 and depresses a print button on an operating panel (not shown) on top of the copying machine, reading unit 13 moves along rails 14 to begin to read the image information, while at the same time, a control circuit (not shown) starts to drive a feed roller 21. With the operation of the roller 21, the topmost of the recording sheets stacked on the feed tray 16 is delivered to recording mechanism 17 wherein thermal recording media 171A to 171D for red, blue, green and black recording colors, respectively, are delivered by supply rolls 172A to 172D arranged in the stated order. Before they are wound by corresponding take-up rolls 173A to 173D, the media 171A 171D pass between thermal heads 174A to 174D and back rollers 175A to 175D, respectively. By driving the thermal heads 174A to 174D, thermal transfer recording is effected on the sheet superimposed on each thermal recording medium. More specifically, a selected part of the heat transferrable ink (which becomes fluid or sublimes upon heating) coated onto one surface of each recording medium is heated and transferred to the recording sheet. The recording sheet, after it is delivered by feed roller 21, is guided by the first guide plate 176A and superimposed on medium 171A for recording in a red color. Thereafter, the recording sheet is separated from medium 171A, guided by the second guide plate 176B, and superimposed on medium 171B for recording in a blue color. The recording sheet is thereafter guided by the third and fourth guide plates 176C and 176D in the same manner and superimposed on media 171C and 171D for recording green and black colors, respectively. The recording sheet, now with the four colors recorded thereon, is discharged to the catch tray 18, thus completing the cycle of color recording.

Figure 2:
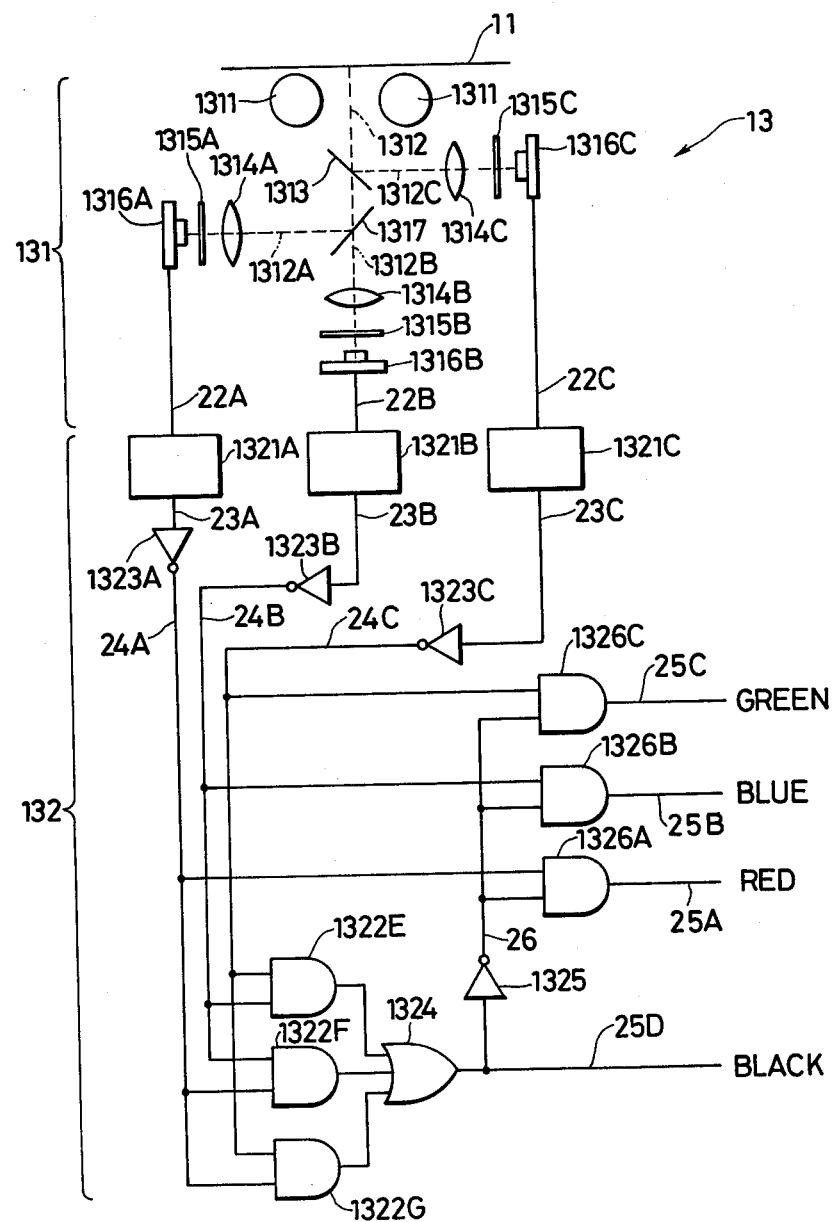
FIG. 2 is a block diagram of the reading unit of the copying machine of FIG. 1.

FIG. 2 is a block diagram of the reading unit of FIG. 1 which selects one specific recording color for each picture element in the original. The unit generally indicated at 13 cons ts of an optical system 131 for effecting color separation and a preferential circuit 132 that selects one specific color in preference over other colors. When the print button on the operating panel is depressed, a pair of fluorescent lamps 1311, 1311 in the optical system 131 are lit, whereupon a light beam 1312 reflected from the original on the platen 11 reaches the first half mirror 1313. The light beam 1312 is reflected by the first half mirror as a light beam 1312C, which passes through a converging lens 1314C and a filter 1315C for the magenta color (the complement of green) and is then converted to a video signal 22C by an image sensor 1316C. The second half mirror 1317 is positioned below the first half mirror 1313. A light beam 1312A that has passed through the first half mirror 1313 and has been reflected from the second half mirror 1317 passes through a converging lens 1314A and a filter 1315A for the cyan color (the complement of red) and reaches an image sensor 1316A which convertsit into a video signal 22A. The light beam 1312B that has passed through the half mirror 1317 passes sequentially through a converging lens 1314B and a filter 1315B for the yellow color (the complement of blue) and reaches an image sensor 1316B which converts it into a video signal 22B.

Figure 3A:
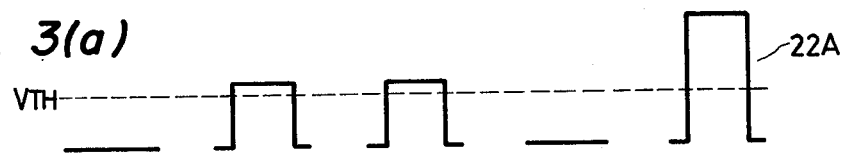
FIGS. 3A-3C are diagrams illustrating the relation between the output of each image sensor in the reading unit and a set of colors to be reproduced.
Figure 3B:
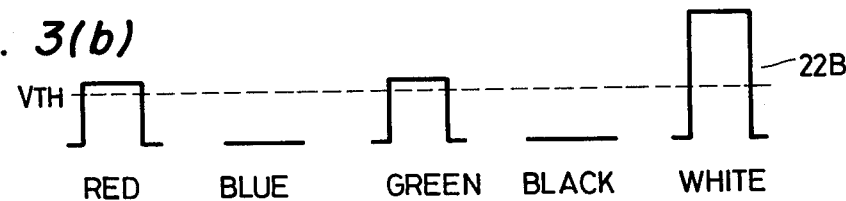
Figure 3C:

FIG. 3 shows the relation between video signals 22A to 22C delivered from respective image sensors 1316A to 1316C and a set of colors to be recorded. The red area of the original produces a voltage level as shown on the left. Since red light is almost completely absorbed by the filter for its complement cyan color, the level of video signal 22A is zero or almost zero as shown in FIG. 3a. The red color is partially transmitted through a yellow or magenta filter, so as shown in FIGS. 3b and 3c, the level of signals 22B and 22C is measurably larger than zero in the red region. The same explanation applies to the blue and green areas of the original. But in the black area, little or no light is reflected from the original, so the level of each video signal is zero or almost zero, and in the white area, the signal level is much greater than zero.

Figure 4A:
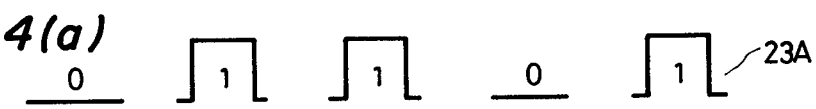
FIGS. 4A-4C are diagrams illustrating the relation between the output of a 2-level signal producing circuit and the same set of colors to be recorded.
Figure 4B:
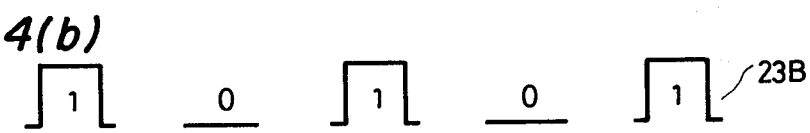
Figure 4C:
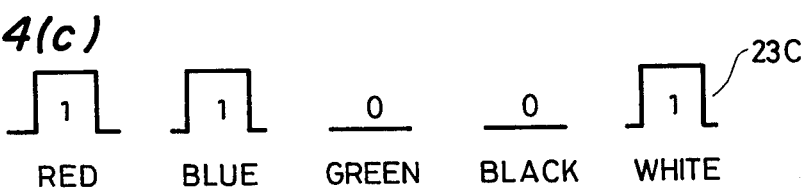

As shown in FIG. 2, the preferential circuit 132 includes 2-level signal forming circuits 1321A to 1321C which produce either a high ("1") or low ("0") level from video signals 22A to 22C by reference to a threshold level $V_{TH}$. The relation between the resulting 2-level (e.g., binary) signals, and the same set of original colors as shown in FIG. 3 are depicted in FIG. 4. In the illustrated copying system, if a chromatic color competes with the black color in the same area of the original, the black color is preferentially selected. In FIG. 4, only one of the three 2-level signals 23A to 23C assumes "0" for each of the red, blue and green colors. Therefore, in the embodiment of FIG. 4, an area producing at least two "0" levels among signals 23A to 23C is assumed to be black, and if all three signals are "1", the area is white. In other cases, one of red, blue and green is selected.

FIG. 2 includes a group of logic circuits for accomplishing the above described preferential selection system. Three 2-input AND circuits 1322E to 1322G form the logical product of a combination of two of the 2-level signals 24A to 24C, which have been inverted by inverters 1323A to 1323C. Therefore, if two or more of the three 2-level signals 23A to 23C are "0", an OR circuit 1324 that forms the logical sum of output signals from the AND circuits 1322E to 1322G produces a black signal 25D having the high level. Then, the thermal head 174D shown in FIG. 1 is driven after a certain delay time and the recording of a black color is effected. The black signal 25D is inverted by an inverter 1325 into a preferential black signal 26 which is supplied to one input terminal of each of three other 2-input AND circuits 1326A to 1326C. These AND circuits are designed so that they produce a red signal 25A, a blue signal 25B and a green signal 25C, respectively. Therefore, in a black color recording mode, each of the signals 25A to 25C has the level "0" and the recording of a chromatic color is inhibited.

Since the inverted signal 24A is fed to the other input terminal of AND circuit 1326A, the level of red signal 25A becomes "1" in the red area of the original as described in connection with FIG. 4. Thus, the thermal head 174A (FIG. 1) is then driven to effect recording of the red color. In a similar manner, signal 24B is fed to the other input terminal of AND circuit 1326B whereas 2-level signal 24C is supplied to the other input terminal of AND circuit 1326C, so that the blue and green colors will be recorded in the appropriate regions of the original. It is to be understood that, as in the recording of the red color, the recording of the blue and green colors must be preceded by a delay time equal to that required for the recording sheet to reach the thermal head 174B or 174C.

Figure 5A:
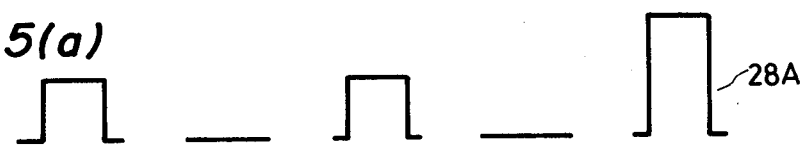
FIGS. 5A-5C are diagrams showing the relation between the output of each image sensor and another set of recording colors.
Figure 5B:
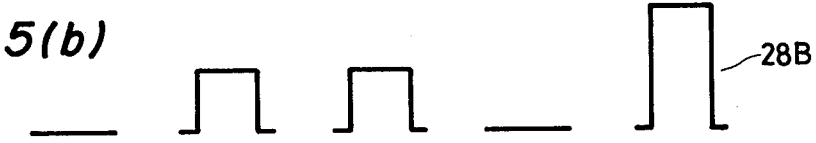
Figure 5C:
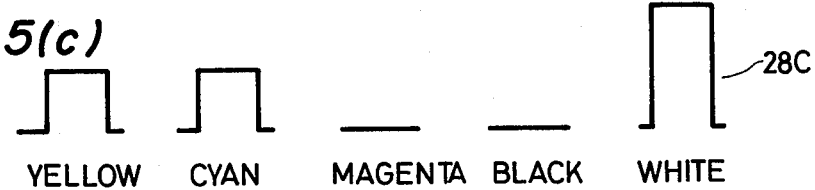

The color copying machine of the present invention also permits the recording of another set of colors, say, yellow, cyan, magenta and black, by setting corresponding supply rolls. In this case, the reading unit 13 must also be modified to use red, blue and green filters. FIG. 5 illustrates the video signals 28A to 38C produced from image sensors 1316A to 1316C in this modified case as compared with the colors to be recorded. It is also to be understood that the color copying machine of the present invention can use recording processes other than a heat transfer process.

As described in the foregoing, the copying machine of the present invention is capable of reproducing image information from each area of an original using a single color closest to the color of that area, so the positions of the respective colors need not be in a high degree of registry, and the machine can be manufactured at low cost. As a further advantage, any unevenness in color can be easily remedied and an image of high quality can be reproduced by recording a single color of the same density as that of the original color.

What is claimed is:

1. A color copying machine, comprising reading means for separating image information from each area of an original into colors corresponding to predetermined recording colors and for forming corresponding video signals, preferential selection means for converting each video signal into a binary signal and for performing an arithmetic operation on each said binary signal to thereby key the image information from each area of the original to one of the recording colors or a white color, and means for reproducing the original with the colors selected by said preferential circuit.

2. An apparatus as claimed in claim 1, wherein said preferential selection means comprises logic means receiving said binary signals, said binary signals representing high and low values of respective chromatic colors.

3. An apparatus as claimed in claim 2, said logic means comprising a first AND gate array, each AND gate of said array receiving one of said binary signals specific to a respective chromatic color, and an inhibit input.

4. An apparatus as claimed in claim 3, said logic means further comprising a second AND gate array including a plurality of AND gates for comparing said binary signals to one another, and for generating an output when any two of said binary signals assume a high level.

5. An apparatus as claimed in claim 4, wherein said output of said second array is applied as said inhibit input, after inversion of the level thereof, such that said AND gates of said first array are inhibited when said second array generates said output.

6. An apparatus as claimed in claim 5, said output of said second array being applied to said reproducing means as an instruction signal for the printing of a black color.

7. An apparatus as claimed in claim 1, wherein said reading means comprises scanning means and at least three filters blocking differing colors, and sensor means receiving the light transmitted through each of said filters.

8. An apparatus as claimed in claim 1, said reproducing means comprising thermal head means driven by outputs of said preferential selection means.

* * * * *